United States Patent [19]

Call et al.

[11] Patent Number: 4,558,876
[45] Date of Patent: Dec. 17, 1985

[54] CHUCK

[75] Inventors: Eugene H. Call, 1418 Richmond House, Golfview Manor, Meadville, Pa. 16335; Armond D. Glover, Meadville, Pa.

[73] Assignee: Eugene H. Call, Meadville, Pa.

[21] Appl. No.: 421,084

[22] Filed: Sep. 22, 1982

[51] Int. Cl.[4] ............................................. B23B 31/10
[52] U.S. Cl. ..................................... 279/1 DA; 279/4; 279/110
[58] Field of Search ................. 279/2, 4, 60, 106, 109, 279/110, 118, 121, 123, 1 DA; 269/134, 136, 137, 138

[56] References Cited

U.S. PATENT DOCUMENTS

| | | | |
|---|---|---|---|
| 1,783,420 | 12/1930 | Garno | 279/106 |
| 2,920,896 | 1/1960 | Buck | 279/123 |
| 2,948,541 | 8/1960 | Reich | 279/4 |
| 3,059,509 | 10/1962 | Sofranko et al. | 279/4 |
| 3,087,737 | 4/1963 | Werth | 279/4 |
| 3,157,408 | 11/1964 | Mann | 279/1 J |
| 3,216,733 | 11/1965 | Parker et al. | 279/2 |
| 3,252,710 | 5/1966 | Buck | 279/121 |
| 3,382,723 | 5/1968 | Connelly | 10/107 |
| 3,413,010 | 11/1968 | Buck | 279/123 |
| 3,424,467 | 1/1969 | Buck | 279/2 |
| 3,468,550 | 9/1969 | Platt et al. | 279/2 |
| 3,494,627 | 2/1970 | Pirman | 279/123 |
| 3,633,929 | 1/1972 | Morawski et al. | 279/2 |
| 3,759,535 | 9/1973 | Hilgers | 279/123 |
| 3,814,449 | 6/1974 | Buck | 279/1 |
| 3,871,670 | 3/1975 | Wright | 279/2 |
| 4,121,848 | 10/1978 | Morawski | 279/110 |

Primary Examiner—Z. R. Bilinsky
Assistant Examiner—Daniel W. Howell
Attorney, Agent, or Firm—Fay, Sharpe, Fagan, Minnich & McKee

[57] ABSTRACT

A chuck selectively convertible between two different configurations for either externally gripping a workpiece while simultaneously pulling same down against stops or internally gripping a workpiece while simultaneously pulling same down against stops. The same components of the chuck mechanism are used in both configurations, and conversion is accomplished simply by reversing certain ones of these components.

17 Claims, 14 Drawing Figures

CHUCK

BACKGROUND OF THE INVENTION

This application relates to the art of chucks and, more particularly, to chucks of the type used for holding workpieces to be operated on by boring or milling equipment. Although the invention is particularly applicable to chucks of the type used for holding workpieces stationary on a table while operating on the workpiece with boring or milling equipment, it will be appreciated that the invention has broader aspects and may be used for other purposes and in other environments including lathes and the like.

It is very common to have chucks which operate by either externally or internally gripping a workpiece while simultaneously pulling same down against stops for rigidly holding the workpiece stationary while performing machining operations thereon. In many prior arrangements, completely separate chucks are required for performing external and internal gripping action, and the need for two completely independent chuck assemblies is very expensive. In addition, complete removal of one chuck assembly from an associated machine or apparatus is time consuming.

Certain prior chuck assemblies have included arrangements for converting the chuck mechanism between two different configurations for either externally gripping a workpiece while simultaneously pulling same down against stops or internally gripping a workpiece while simultaneously pulling same downwardly against stops. Previous arrangements of this type have, however, been relatively complicated to convert or have not provided optimum gripping and pulling action in both configurations while affording high accuracy and repeatability.

It has, therefore, been considered desirable to provide a chuck assembly with features enabling selective convertibility between two different configurations for gripping a workpiece either externally or internally, while simultaneously pulling the workpiece down against stops in either configuration. The subject invention meets these needs and others while overcoming problems previously encountered with prior art chucking devices.

BRIEF SUMMARY OF THE INVENTION

A chuck assembly is provided which is selectively convertible between externally or internally gripping a workpiece, while simultaneously pulling the workpiece downwardly against stops. The same components of the chuck mechanism are used in both configurations, and conversion is accomplished simply by reversing the positions of certain of these components.

In one arrangement, the chuck assembly includes support means for supporting components of the chuck and the support means has a longitudinal axis. A plurality of circumferentially-spaced jaws are supported by the support means for movement with components extending both generally radial and generally parallel to the longitudinal axis. Power means is provided for selectively moving the jaws, and motion conversion means is connected between the power means and jaws for converting movement of the power means generally parallel to the axis into movement of the jaws with components extending both generally radial and generally parallel to the axis. Stops are supported by the support means for abutment by workpieces gripped by the jaws. The motion conversion means is selectively reversible between first and second positions for gripping workpieces externally or internally, respectively, while simultaneously pulling same firmly against the stops in response to movement of the power means in a workpiece clamping direction.

The power means for moving the jaws may take many forms, and may be in the form of a draw bar or a piston. While pneumatic operation of the power means is a preferred form, it will be recognized that the power means can be operated by alternative means.

In a preferred arrangement, the support means includes a top plate having a plurality of circumferentially-spaced openings therethrough receiving the motion conversion means. The openings include inner and outer cam surfaces spaced from one another generally radially of and inclined relative to the longitudinal axis of the support means. The motion conversion means includes slide blocks extending through the openings in the top plate, and having inner and outer cam follower surfaces extending substantially parallel to the cam surfaces for cooperation therewith. The slide blocks are connected to the power means and to the jaws whereupon movement of the power means results in movement of the slide blocks with components extending both generally radial and generally parallel to the axis. In the first position of the motion conversion means, the cam and cam follower surfaces slope outwardly away from the axis in a direction from the bottom surface of the top plate to the upper surface thereof. In the second position of the motion conversion means, the cam and cam follower surfaces slope inwardly toward the axis in a direction from the bottom surface of the top plate to the upper surface thereof.

The jaws preferably move along linear paths inclined relative to the longitudinal axis of the support means so that movement of the jaws along such linear paths includes components extending both generally radial and generally parallel to the axis.

In a preferred form, slide blocks extend slidably through gibs positioned in the top plate openings. Both the gibs and the slide blocks are reversible for converting the chuck between its two configurations for either external or internal workpiece gripping action.

The power means for moving the jaws may be connected to the slide blocks by links pivotally connected to the power means and to the slide blocks.

It is a principal object of the present invention to provide an improved chuck assembly selectively convertible between two different configurations for externally or internally gripping a workpiece while simultaneously pulling same against stops.

It is also an object of the invention to provide such a chuck assembly in which the same chuck mechanism components are used in both of the chuck configurations.

It is an additional object of the invention to provide such a chuck assembly in which conversion between the two different configurations is highly simplified.

It is another object of the invention to provide a chuck assembly which is relatively simple to manufacture and assemble.

It is a further object of the invention to provide a chuck assembly in which high accuracy and repeatability are possible.

BRIEF DESCRIPTION OF THE DRAWINGS

The invention may take form in certain parts and arrangements of parts, preferred embodiments of which will be described in detail in this specification and illustrated in the accompanying drawings which form a part hereof and wherein.

DESCRIPTION OF PREFERRED EMBODIMENTS

Figure 1:
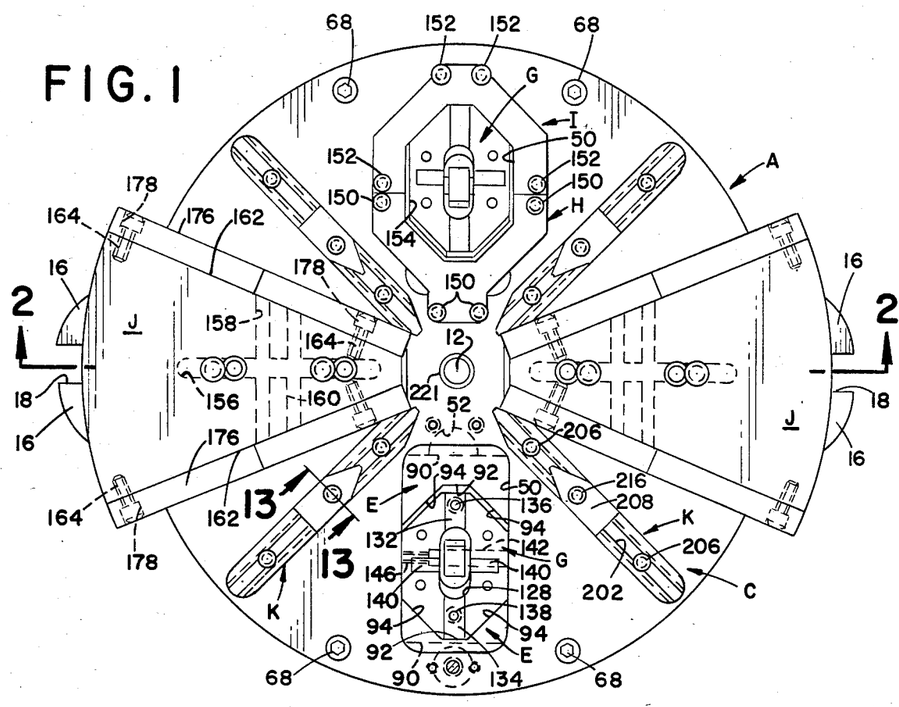
FIG. 1 is a plan view of an improved chuck constructed in accordance with the present invention.
Figure 2:
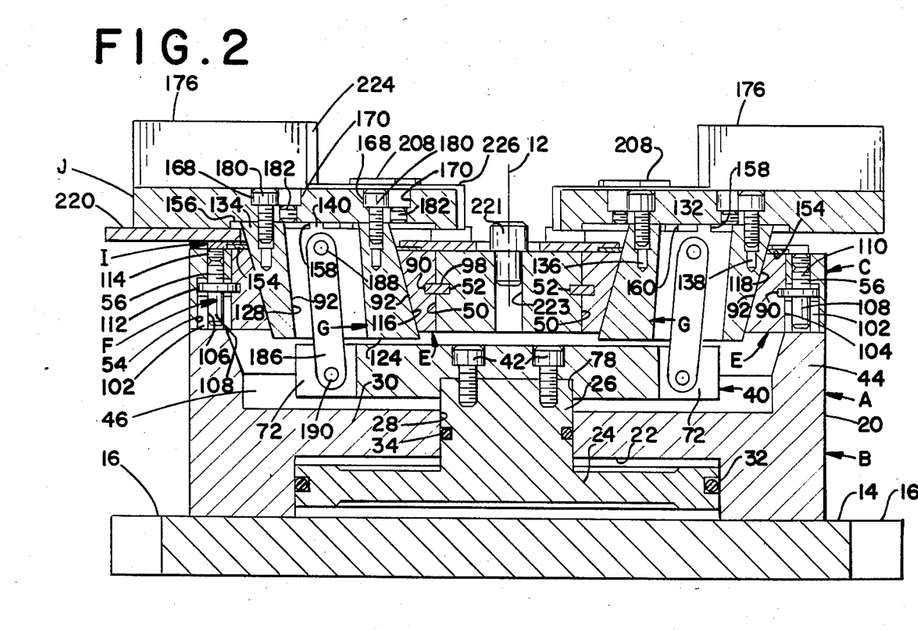
FIG. 2 is a cross-sectional elevational view generally along lines 2—2 of FIG. 1.

Referring now to the drawing, wherein the showings are for purposes of illustrating preferred embodiments of the invention only and not for purposes of limiting same, FIGS. 1 and 2 show an improved chuck assembly A including support means B for supporting the various components of the chuck and having a longitudinal axis 12.

Support means B includes a support plate 14 having oppositely disposed pairs of spaced-apart ears 16 between which a recess 18 is defined for receiving a suitable fastener to secure base plate 14 to, for example, the table of a boring or milling machine. Support means B further includes a generally circular base member 20 suitably secured to base plate 14 and cooperating therewith to define a cylinder 22 receiving a piston 24 having a central extension 26 projecting upwardly through a central hole 28 in top wall 30 of cylinder 22. The outer periphery of piston 24 has a suitable circumferential groove therein receiving an O-ring 32 for sealing engagement with the peripheral wall of cylinder 22. Piston extension 26 extends slidably through hole 28 and has a suitable circumferential groove therein receiving an O-ring 34 which engages the peripheral wall of hole 28 in a sliding-sealing relationship. A spider member 40 is suitably secured to the upper end of piston extension 26 as by fasteners 42 extending through suitable holes in the spider member and into tapped holes in piston extension 26. Spider member 40 is located above cylinder top wall 30 outside of cylinder 22. Base member 20 has an annular upstanding peripheral wall 44 within which a cavity 46 is defined for accommodating the spider member.

Figures 3, 4:
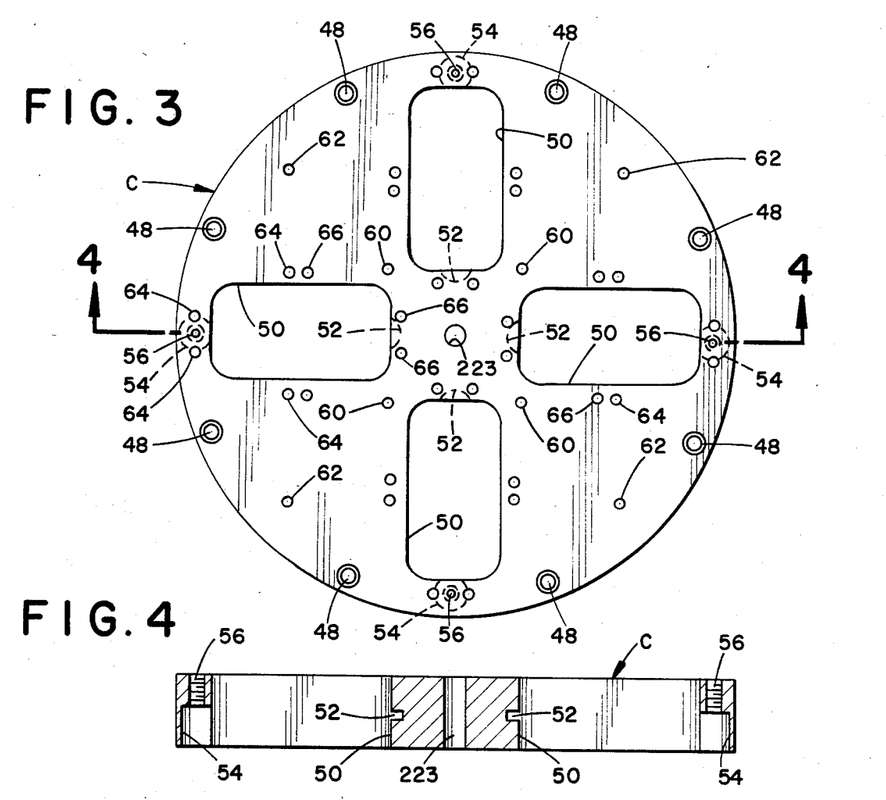
FIG. 3 is a plan view of a top plate used with the chuck of FIGS. 1 and 2.
FIG. 4 is a cross-sectional elevational view taken generally along lines 4—4 of FIG. 3.

With reference to FIGS. 3 and 4, a flat, circular top plate C has a plurality of equidistantly circumferentially-spaced holes 48 therethrough adjacent the outer periphery thereof. These holes receive suitable fasteners which, in turn, extend into suitable tapped holes in base member annular wall 44 to secure top plate C against the flat upper end of wall 44. Four generally rectangular openings 50 are equidistantly circumferentially-spaced from one another and extend axially through top plate C. An arcuate keyway 52 is formed inwardly from the inner end of each opening 50 midway between the bottom and upper surfaces of the top plate. Generally cylindrical recesses 54 extend upwardly from the bottom surface of top plate C at the outer ends of each opening 50 over a distance slightly greater than one-half the thickness of plate C and intersect threaded holes 56. Pairs of radially-spaced inner and outer tapped holes 60,62 extend inwardly from the upper surface of top plate C for receiving fasteners to secure stop member guides to the top plate upper surface. Groups of four spaced-apart outer tapped holes 64 are located adjacent each opening 50 for receiving fasteners to secure an outer wiper holder to the top plate outer surface. Groups of four inner tapped holes 66 are provided adjacent each opening 50 for receiving fasteners to secure an inner wiper holder adjacent each opening.

With reference to FIGS. 1-4, FIGS. 1 and 2 show top plate C secured to the flat upper end of base member annular wall 44 as by fasteners 68 of FIG. 1 extending through holes 48 in FIG. 3 through top plate C and into suitable tapped holes in wall 44.

Figure 5:
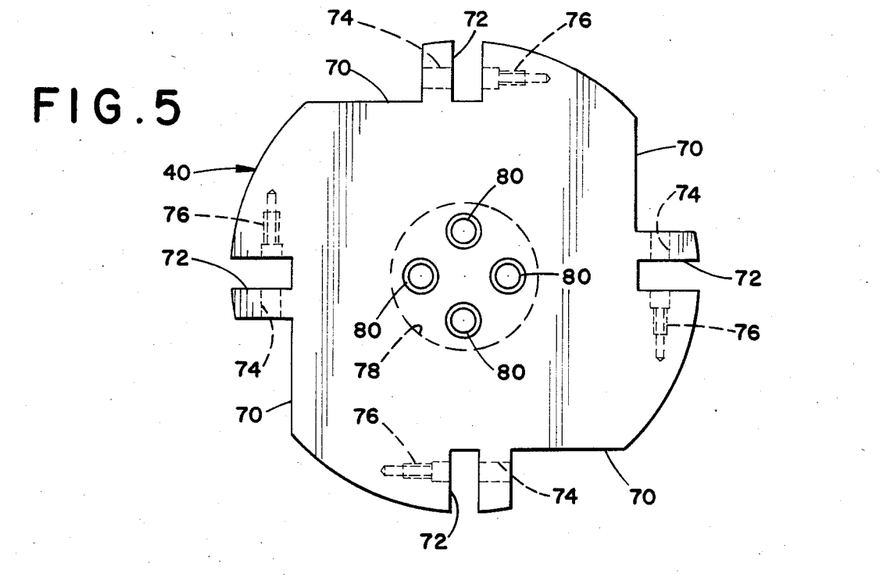
FIG. 5 is a plan view of a spider member used in the chuck assembly.

FIG. 5 shows generally circular spider member 40 having equidistantly spaced notches 70 and recesses 72 in the periphery thereof. Holes 74 extend from the bottom ends of notches 70 to intersection with recesses 72 and are aligned with threaded bores 76. A central, circular recess 78 in the bottom surface of spider member 40 is dimensioned for closely receiving cylindrical extension 26 on piston 24. Countersunk holes 80 through spider member 40 receive fasteners 42 of FIG. 2. Holes 74,76 receive shoulder screws for pivotally connecting links having end portions received in recesses 72.

Figure 6:
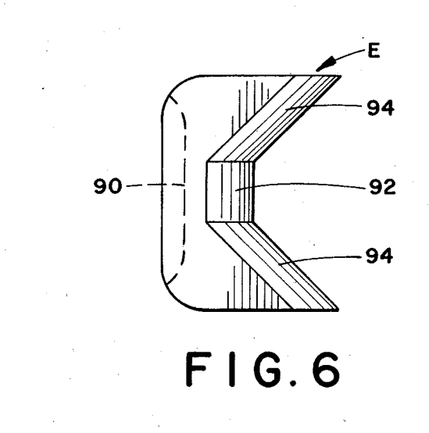
FIG. 6 is a plan view of a gib block.
Figure 7:
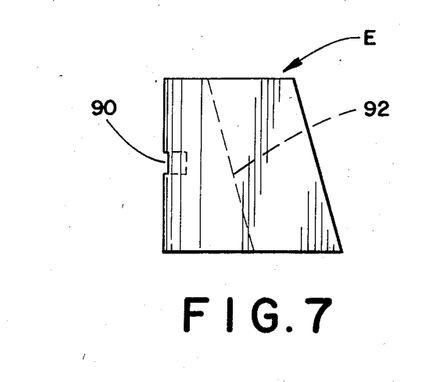
FIG. 7 is a side elevational view of the gib block of FIG. 6.

FIGS. 6 and 7 show a gib member E in the general form of a V-block. Gib member E has a thickness approximately the same as the thickness of top plate C, and is externally shaped and dimensioned for close reception within top plate openings 50 at the inner and outer end portions thereof. Gib member E includes a keyway 90 alignable with keyways 52 at the inner ends of openings 50 in top plate C. Keyway 90 is located midway between the upper and lower surfaces of the gib member so the keyway will be in the same vertical location when the gib member is inverted. Gib member E also includes a cam surface inclined to the vertical, and defined by a central inclined surface 92 and opposite diverging inclined surfaces 94.

As shown in FIGS. 1 and 2, a pair of gib members E are positioned in each opening 50 in the top plate. One gib member is located at the inner end of each opening 50 and the other gib member is located at the outer end of each opening. The two members in each opening 50 are inverted relative to one another so that inclined surface 92 on one gib member extends parallel to the corresponding inclined surface 92 on the other gib member.

As shown in FIG. 2, a key 98 is received in keyways 52,90 for releasably retaining the inner gib member at the inner end of an opening 50. A tubular member 102 has an external flat 104 thereon engageable with the flat rear end of a gib member E positioned at the outer end of an opening 50. Tubular member 102 has a smooth hole 106 therethrough rotatably receiving a smooth stem 108 on an adjusting screw F having an externally threaded upper end portion 110 threaded into tapped hole 56 in top plate C. A circumferential projection 112 defines a key on adjusting screw F and is received in keyway 90 on the outer gib member E. A set screw 114 threaded into tapped hole 56 above adjusting screw F locks same in position.

Removal of set screw 114 provides access to adjusting screw F by a suitable tool for rotating same to vertically adjust the position of key 112 and thereby adjust the vertical position of the outer gib member E. This, in turn, accommodates adjustment of the distance between the cam surfaces on the inner and outer gib members in each opening 50. The size of the gib member is such that two gib members do not occupy an entire opening 50 and are spaced-apart from one another a substantial distance to allow easy insertion and removal of the gib members simply by pulling them off the keys 98 or 112.

Figure 10:
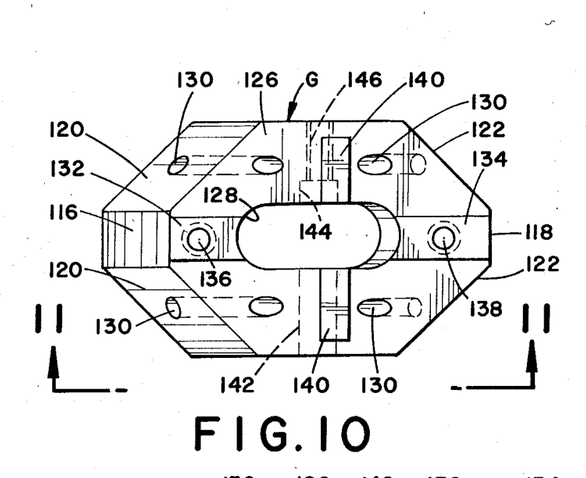
FIG. 10 is a plan view of a slide block
Figure 11:
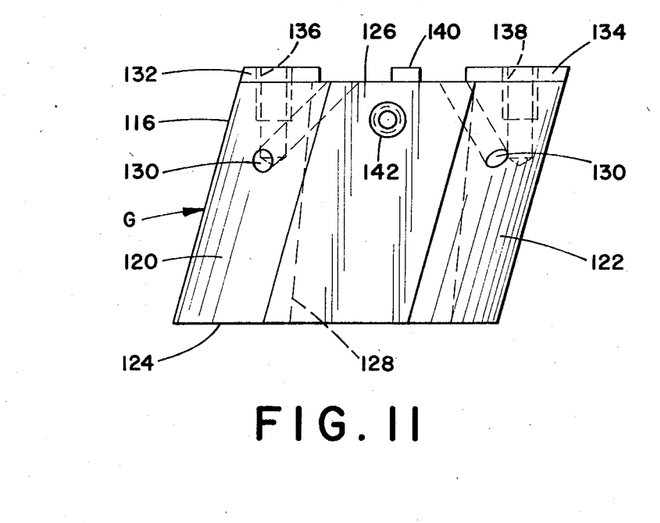
FIG. 11 is a side elevational view taken generally along lines 11—11 of FIG. 10.

FIGS. 10 and 11 show a slide block G having a vertical thickness substantially greater than the thickness of top plate C. The opposite ends of slide block G have cam follower surfaces inclined to the vertical at the same inclination as the cam surfaces on gib member E. The cam follower surfaces on slide block G are defined by parallel central inclined surfaces 116,118 each having a pair of side inclined surfaces 120,122 diverging from one another. The size and slope of the slide block inclined cam follower surfaces correspond to the size and slope of the gib member inclined cam surfaces.

Slide block G has a planar bottom surface 124 and an upper surface 126 with a substantially central opening 128 extending completely therethrough between bottom and upper surfaces 124,126. Opening 128 has a generally oval configuration in cross-section. A plurality of holes 130 extend between top surface 126 and inclined side surfaces 120,122 for receiving wick material which is saturated with oil to provide lubrication to the outer peripheral sliding surfaces of the slide block.

Central longitudinal projections 132,134 extend upwardly from upper surface 126, and span the distance between opening 128 and inclined surfaces 116,118. Vertical tapped holes 136,138 are provided in slide block G in the area of longitudinal projections 132,134. Transverse projections 140 extend upwardly from upper surface 126 on opposite sides of opening 128. All of projections 132,134 and 140 extend upwardly from upper surface 126 approximately the same distance. A transverse smooth hole 142 extends from one side of slide block G to intersection with opening 128 adjacent upper surface 126. Hole 142 is aligned with a countersunk smooth hole 144 of the same size extending inwardly of slide block G on the opposite side of opening 128 and intersecting a smaller diameter tapped hole 146. Holes 142,144 and 146 receive a shoulder screw for pivotally connecting an end portion of a link to slide block G. The peripheral size and shape of the slide block is arranged for close sliding reception in opening 50 between the opposite gib members E as shown in FIGS. 1 and 2.

As shown in FIG. 1, inner and outer flat, generally U-shaped wiper holders H and I are secured to the upper surface of top plate C in surrounding relationship to each slide block G. The central opening formed within cooperating wiper holders H and I is of substantially the same shape as the peripheral shape of a slide block and has a size slightly larger than the peripheral size thereof. Inner wiper holder H is secured to top plate C as by an inner group of fasteners 150 extending through suitable holes in the inner wiper and into inner group of tapped holes 66 in the top plate C (FIG. 3). Outer wiper holder I is secured to top plate C as by an outer group of fasteners 152 extending through suitable holes in the outer wiper and into outer group of tapped holes 64 (FIG. 3). A wiper member 154 is retained by wiper holders H and I in engagement with the upper surface of top plate C and with the outer peripheral surface of slide block G.

Figures 8, 9:
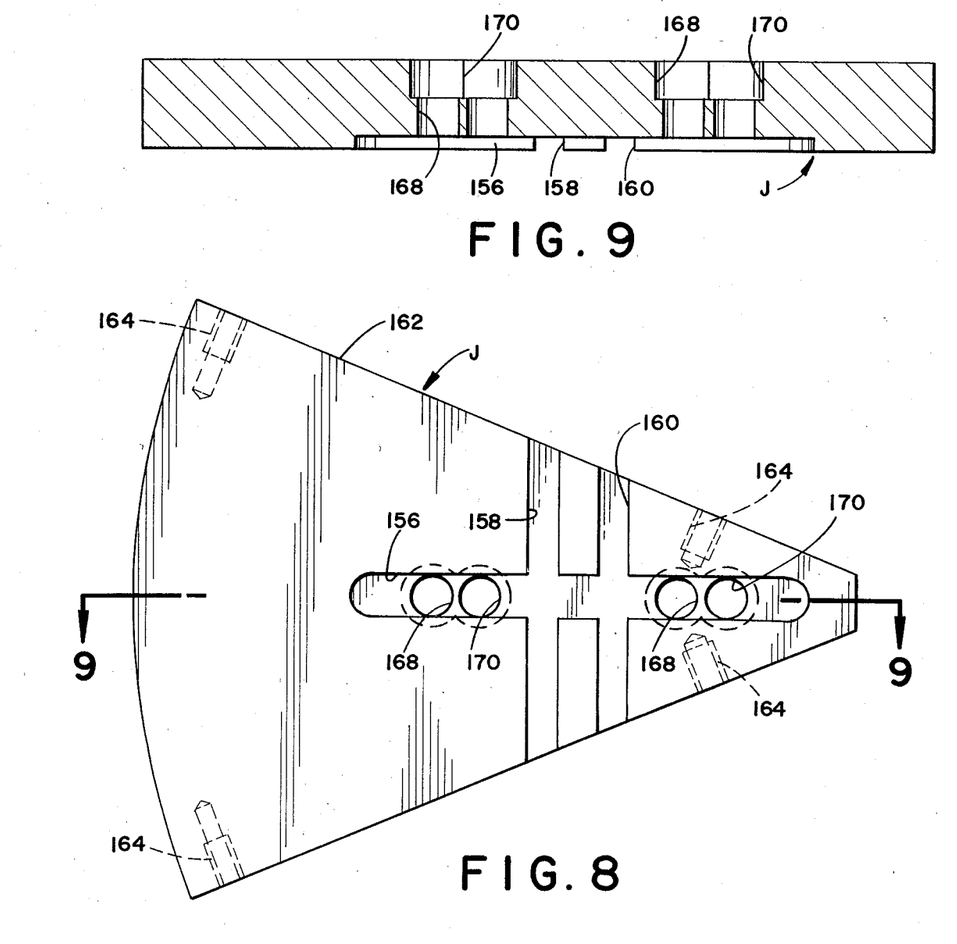
FIG. 8 is a bottom view of a jaw holding plate in the general shape of a pie slice.
FIG. 9 is a cross-sectional elevational view taken generally along lines 9—9 of FIG. 8.

FIGS. 8 and 9 show a jaw holder J in the form of a generally flat plate having the general shape of a pie slice. The bottom surface of jaw holder J is provided with a central longitudinal groove 156 and a pair of spaced-apart transverse grooves 158,160. Opposite sides 162 of jaw holder J are provided with a pair of spaced-apart tapped holes 164 for use in securing gripping jaws thereto. Two pair of countersunk tapped holes extend through jaw holder J in alignment with longitudinal groove 156. Each pair of holes 168,170 are positioned closely adjacent one another in slightly spaced-apart relationship parallel to longitudinal groove 156. The distance between holes 168 in the two pair is substantially the same as the distance between holes 170.

FIG. 1 shows opposite flat plates 176 defining gripping jaws secured to the opposite sides of jaw holders J. Each jaw plate has a pair of countersunk holes 178 therethrough aligned with tapped holes 164 for receiving fasteners to securely clamp the jaws against jaw holder opposite sides 162. Plates 176 are comprised of a readily machinable metal for reasons which will become apparent hereinafter. These gripping jaws are commonly referred to as soft jaws.

Jaw holders J are positioned on top of slide blocks G with slide block longitudinal projections 132,134 received in longitudinal groove 156. In the arrangement of FIG. 2, transverse projections 140 are received in transverse groove 158 in jaw holder J. Jaw holder holes 168 are aligned with tapped holes 136,138 so that fasteners 180 thread only into tapped holes 136,138 and do not threadably engage the tapped portions of holes 168,170. Plugs 182 are threaded into the tapped portions of holes 170. When slide blocks G are rotated 180° about a vertical axis for converting the chuck to internally grip workpieces, slide block projections 140 will be received in jaw holder transverse groove 160. Moreover, the fasteners 180 will be received in holes 170, and plugs 182 will be received in holes 168.

Elongated flat links 186 include holes through the opposite end portions thereof for receiving shoulder screws 188,190 as shown in FIG. 2. One end portion of each line 186 is received in a recess 72 in spider member 40 and the remainder of the link extends upwardly into opening 128 in slide block G.

Figure 13:
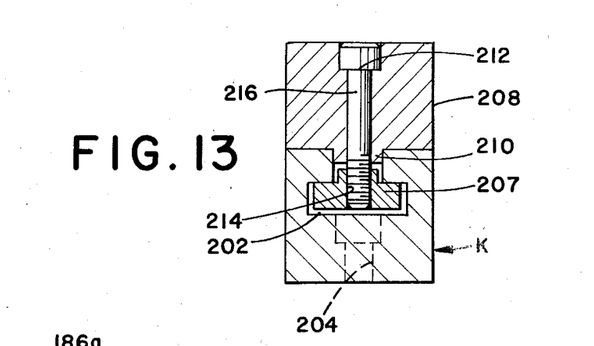
FIG. 13 is a partial cross-sectional elevational view taken generally along lines 13—13 of FIG. 1; and, FIG. 14 is a cross-sectional elevational view similar to FIG. 2 and showing another arrangement for connecting a piston with slide blocks.

FIG. 1 shows elongated guide tracks K extending radially of longitudinal axis 12 midway between adjacent jaw holders J. As shown in FIG. 13, guide track K has an upwardly opening groove 202 of inverted generally T-shaped cross-section. Counterbore holes 204 extend vertically through guide track K adjacent the opposite ends thereof for receiving fasteners 206 of FIG. 1 which extend into tapped holes 60,62 in top plate C of FIG. 3.

A nut 207 having an inverted T-shaped cross-section is received in groove 202. Nut 207 is rectangular-shaped in plan view so it cannot rotate relative to groove 202. A stop member 208 has a central bottom projection 210 of a rectangular cross-section extending into the entrance of groove 202 so that stop member 208 cannot rotate relative to guide track K. Stop member 208 has a counterbore hole 212 therethrough alignable with a tapped hole 214 in nut 207 for receiving a suitable fastener indicated at 216 in FIG. 1 for locking stop member 208 to guide track K. Loosening of fastener 216 allows radial adjustment of stop member 208 along guide track K.

Suitable ports (not shown) are provided in support means B for connecting cylinder 22 with pressurized air above or below piston 24 while connecting the cylinder on the opposite side of the piston to atmosphere for selectively moving piston 24 upwardly or downwardly. In the arrangement shown and described, piston 24 moves linearly parallel to longitudinal axis 12, and slide blocks G effectively define motion conversion means for converting this linear movement into movement of jaw holders J along a path inclined to axis 12 with components extending both generally radial and generally parallel to axis 12. In the arrangement of FIG. 2, the setup is for externally gripping workpieces with jaw holders J being movable radially inwardly toward axis 12 and downwardly during downward movement of piston 24. Cam surfaces 92 and cam follower surfaces 116,118 are inclined outwardly away from longitudinal axis 12 in a direction from the bottom surface of top plate C to the upper surface thereof. In this configuration, downward movement of piston 24 will result in downward movement of slide blocks G and cooperation between cam and cam follower surfaces 92,118 causes jaw holders J to move radially inward toward longitudinal axis 12 while simultaneously moving downwardly toward the upper surface of top plate C.

In arranging an initial setup, jaws 176 are of rectangular configuration when originally secured to a jaw holder J. Piston 24 is moved upwardly for moving jaw holders J upwardly to allow insertion of spacer plates 220 beneath jaw holders J and wiper holders I. Piston 24 is then moved downwardly for engaging jaw holders J with spacer plates 220. A center plug 221 disposed in a central opening 223 in top plate C provides a center reference point for locating purposes and for making measurements and the like. With chuck A clamped to the table of a milling machine, the distance from longitudinal axis 12 to the external surface of a workpiece to be clamped is measured off along rectangular jaws 176. The jaws are then machined to the measured area for providing gripping shoulders 224 facing radially inward toward longitudinal axis 12 and horizontal surfaces 226 facing upwardly but spaced slightly below the upper surfaces of stops 208. It will be recognized that spacer plates 220 have a vertical thickness substantially less than the vertical distance over which piston 24 and slide blocks G are capable of moving. Moreover, these spacer plates may advantageously take the form of a tuning fork type or U-shaped structure which is easily inserted into position and withdrawn therefrom as needed and/or desired.

Subsequent to milling of jaws 176 to the desired diameter of gripping shoulders 224, spacer plates 220 are removed. In order to perform operations on a workpiece, piston 24 is moved upwardly for moving jaws 176 radially outward from axis 12. A workpiece is then positioned on stops 208 or horizontal jaw surfaces 226. Pressurized air is then supplied for moving piston 24 downwardly to move jaw holders radially inward toward axis 12 until jaw shoulders 224 externally grip the workpiece. The use of the spacer plates 220 insures that sufficient vertical clearance will be provided between the bottom surface of jaw holders J and the wiper holders H,I before the jaw holders bottom out. This means that substantial vertical downward pulling force is supplied by jaws 176 to the workpiece for holding same securely against stops 208 while also clamping the workpiece radially.

Figure 12:
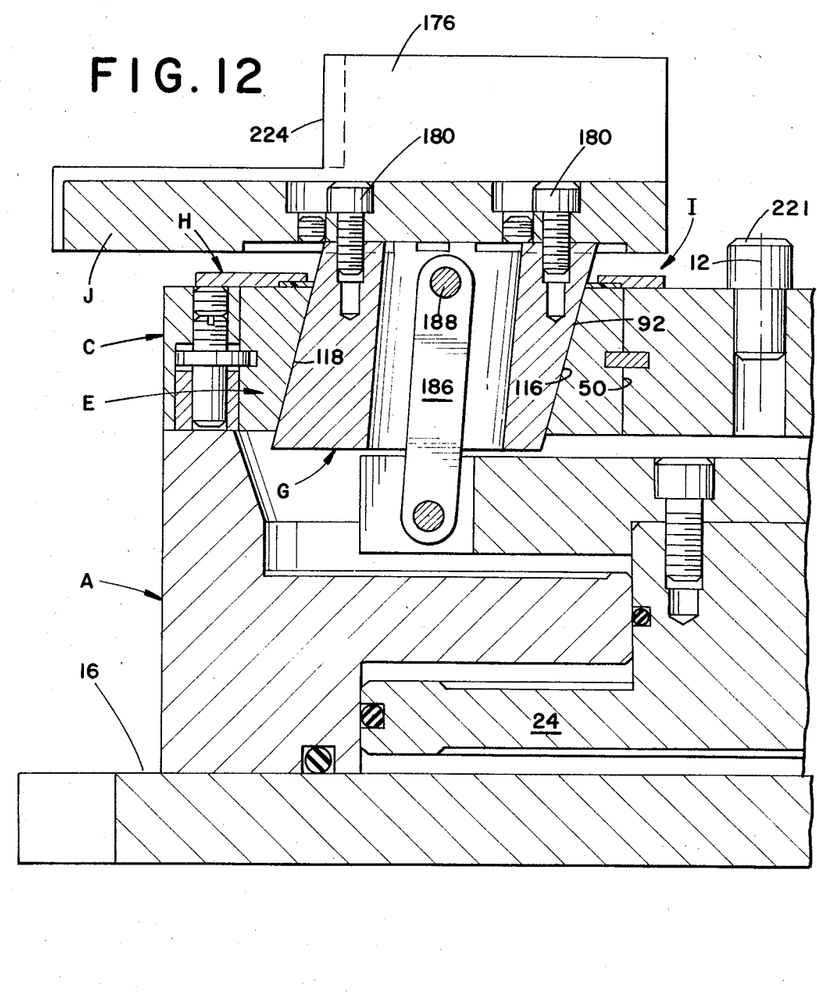
FIG. 12 is a partial cross-sectional elevational view similar to FIG. 2 and showing the jaw motion conversion mechanism reversed for internal clamping of a workpiece by the clamping jaws.

The configuration of the chuck can be changed to the arrangement shown in FIG. 12 for internally gripping workpieces while simultaneously pulling same down firmly against stops 208. In order to change between different configurations, fasteners 180 are removed for separating jaw holders J from slide blocks G. Wiper holders H,I and the wiper held thereby are also removed. Piston 24 is moved upwardly so that slide block G is in its maximum upward position to provide access to the shoulder screw forming upper pivot connection 188 with link 186. After removal of shoulder screw 188, slide block G can be removed for rotation 180° about a vertical axis. While slide block G is removed, inner and outer gib members E are also removed from opening 50 and either inverted or the positions of the inner and outer gib members are reversed. The other parts are then reassembled.

With the foregoing reversal of the motion conversion means, cam surfaces 92, and cam follower surfaces 116,118 slope relative to longitudinal axis 12 in a direction inwardly toward axis 12 when proceeding from the bottom surface of top plate C to the upper surface thereof. In this configuration, downward movement of slide blocks G with downward movement of piston 24 produces downward and radial outward movement of jaw holders J. Thus, a workpiece may be internally gripped by jaw shoulders 224 while being pulled downwardly against stops 208. It will be recognized that new jaws 176 can be provided for each different type of workpiece and for gripping externally or internally, with the new jaws being machined to the proper dimension in the manner previously described.

Figure 14:
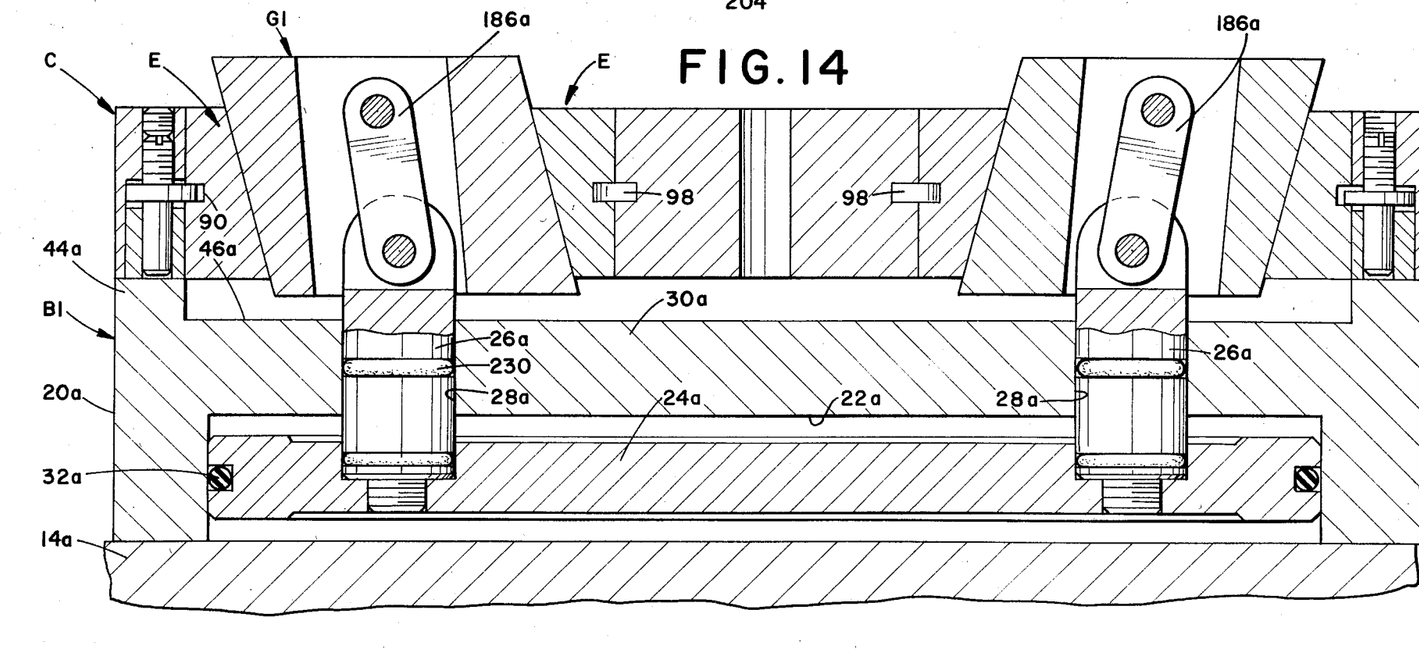

FIG. 14 shows another arrangement wherein support means B1 includes a base plate 14a and a base member 20a defining a cylinder 22a receiving a piston 24a having an O-ring 32a received in a peripheral groove therein. Top wall 30a of cylinder 22a has a plurality of circumferentially-spaced holes 28a therethrough slidably and sealingly receiving elongated rods 26a suitably attached to piston 24a and to links 186a. Suitable O-rings 230 are positioned in circumferential grooves in rods 26a for sealing same with the periphery of holes 28a. Links 186a are connected with slide blocks G in the same manner as previously described and the mechanism otherwise operates in the same manner.

The foregoing modified arrangement facilitates elimination of spider member 40 (FIG. 2) so that cavity 46a of FIG. 14 can be of substantially smaller vertical height than cavity 46 of FIG. 2. Thus, overall chuck assembly is of very low profile. Top plate C is secured to annular wall 44a of support member 20a in the same manner described with reference to FIGS. 1 and 2. The positions of the motion conversion means in FIG. 14 are selectively reversible in the same manner heretofore described with reference to FIGS. 1 and 2. Again, such reversal provides either external or internal gripping action by the jaws while simultaneously pulling a workpiece down against stops when the piston moves in the same workpiece gripping direction.

It will be recognized that the particular chuck shown and described in the present application employs four jaw holders J and eight jaws 176, with two jaws being secured to each jaw holder. However, it is to be recognized that a larger or smaller number of such jaw holders and jaws may be provided if so desired without departing from the overall intent or scope of the invention. In addition, FIG. 1 shows a plan view of the chuck assembly with two of the jaw holders omitted, ie., at the twelve and six o'clock positions, for showing the configuration of the chuck assembly beneath the jaw holders. At the twelve o'clock position, only the jaw holder and jaws are removed, while at the six o'clock position, the wiper and wiper holders are also removed.

The invention has been shown and described with reference to preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A chuck for selectively gripping workpieces externally or internally generally radially of a longitudinal axis while simultaneously pulling the workpieces against stops, said chuck comprising:

support means for supporting components of a chuck and having a longitudinal axis, a plurality of circumferentially-spaced jaws supported by said support means for movement with components extending both radially and parallel to said axis, power means for selectively moving said jaws, motion conversion means connected between said power means and said jaws for converting movement of said power means generally parallel to said axis into movement of said jaws with components extending both radial and parallel to said axis, stops supported by said support means for abutment by workpieces gripped by said jaws, said motion conversion means being selectively reversible between first and second positions for respectively externally or internally gripping workpieces while simultaneously pulling same firmly against said stops in response to movement of said power means in a workpiece clamping direction, said support means including a top plate having a plurality of circumferentially-spaced openings therethrough receiving said motion conversion means, said openings including inner and outer substantially parallel cam surfaces spaced from one another generally radially of and inclined relative to said axis, said motion conversion means including slide blocks extending through said openings and having inner and outer cam follower surfaces extending substantially parallel to one another and to said cam surfaces for cooperation therewith, means for connecting said slide blocks to said power means and to said jaws whereupon movement of said power means results in movement of said slide blocks with components extending both radially and parallel to said axis, said cam and cam follower surfaces in said first position of said motion conversion means sloping outwardly away from said axis from the bottom surface of said top plate to the upper surface thereof, and said cam and cam follower surfaces in said second position of said motion conversion means sloping inwardly toward said axis from the bottom surface of said top plate to the upper surface thereof.

2. The chuck as defined in claim 1 including means for adjusting said stops generally radially of said axis.

3. The chuck as defined in claim 1 wherein said power means comprises a fluid operated piston received in a cylinder in said support means for movement of said piston generally parallel to said axis, and connecting means for connecting said piston with said motion conversion means.

4. The chuck as defined in claim 3 wherein said connecting means includes a spider attached to said piston and being positioned outside of said cylinder, and links connected between said spider and said motion conversion means.

5. The chuck as defined in claim 3 wherein said cylinder includes a top wall having a plurality of circumferentially-spaced holes therethrough and said connecting means includes a plurality of rods attached to said piston and slidably extending through said holes in sealed relationship therewith, and said rods being connected with said motion conversion means.

6. The chuck as defined in claim 1 including a plurality of circumferentially-spaced jaw mounting plates attached to said motion conversion means, and each said jaw mounting plate having a pair of jaws mounted thereon.

7. The chuck as defined in claim 6 wherein each said jaw mounting plate is in the general form of a pie slice having opposite side surfaces extending substantially radially of said axis, said jaws being attached to said side surfaces.

8. The chuck as defined in claim 1 wherein said motion conversion means includes means for providing linear movement of said jaws along paths inclined relative to said axis.

9. A chuck for selectively gripping workpieces externally or internally generally radially of a longitudinal axis while simultaneously pulling the workpieces against stops, said chuck comprising:

support means for supporting components of a chuck and having a longitudinal axis, a plurality of circumferentially-spaced jaws supported by said support means for movement with components extending both radially and parallel to said axis, power means for selectively moving said jaws, motion conversion means connected between said power means and said jaws for converting movement of said power means generally parallel to said axis into movement of said jaws with components extending both radially and parallel to said axis, stops supported by said support means for abutment by workpieces gripped by said jaws, said motion conversion means being selectively reversible between first and second positions for respectively externally or internally gripping workpieces while simultaneously pulling same firmly against said stops in response to movement of said power means in a workpiece clamping direction, said support means including a top plate having a plurality of circumferentially-spaced generally rectangular openings therethrough, inner and outer gibs positioned in each of said openings and having substantially parallel inner and outer gib cam surfaces inclined relative to said axis, a slide block received in each said opening and having substantialy parallel cam follower surfaces cooperating with said cam surfaces, said jaws being mounted on said slide blocks above said top plate, said slide blocks being connected with said power means and defining said motion conversion means by moving said jaws in linear paths inclined to said axis with components of movement extending both radially of and parallel to said axis, and said slide blocks and gibs being reversible for converting between external and internal workpiece gripping action.

10. The chuck as defined in claim 9 including gib adjusting means for adjusting at least one of said gibs in each said opening generally parallel to said axis.

11. A chuck for simultaneously gripping workpieces and pulling same against stops comprising:

support means for supporting chuck components and having a longitudinal axis, a substantially flat top plate supported by said support means and having a plurality of circumferentially-spaced openings therethrough, a plurality of stops supported on said top plate, a plurality of slides slidably supported by gibs and guided through said openings in said top plate for movement along linear paths inclined to said axis, said slides having upper ends extending generally parallel to the upper surface of said top plate, and workpiece gripping jaws mounted on said upper ends of said slides, whereby movement of said slides produces movement of said jaws with components extending both generally radially of and parallel to said axis for simultaneously gripping workpieces and pulling same down against said stops, said slides and gibs being reversible between a first position in which movement of said slides produces movement of said jaws with components acting radially inward of said axis and downwardly parallel thereto and a second position in which movement of said slides produces movement of said jaws with components acting radially outward of said axis and downwardly parallel thereto.

12. The chuck as defined in claim 11 including means for adjusting said stops generally radially of said axis.

13. The chuck as defined in claim 11 including power means movable generally parallel to said axis for moving said slides, connecting links pivotally connected to said slides and to said power means, said power means including a fluid operated piston received in a cylinder in said support means, said cylinder having a top wall with a central opening therethrough, said piston having a central extension slidably extending through said opening in sealed relationship therewith, a spider attached to said extension above said cylinder top wall, and said links being pivotally connected to said spider.

14. The chuck as defined in claim 11 including power means movable generally parallel to said axis for moving said slides, connecting links pivotally connected to said slides and to said power means, said power means including a fluid operated piston received in a cylinder in said support means, said cylinder having a top wall with a plurality of circumferentially-spaced openings therein equal in number to said slides, a plurality of rods slidably extending through said openings in sealed relationship therewith, and said links being pivotally connected with said rods above said cylinder top wall.

15. The chuck as defined in claim 11 wherein said upper ends of said slides and said gripping jaws have cooperating interdigitated projections and recesses.

16. The chuck as defined in claim 11 wherein each said slide has bottom an upper surfaces, an opening extending completely through each slide between said bottom and upper surfaces thereof, power means for moving said slides, links pivotally connected between said power means and said slides, said links being received in said openings in said slides and being pivotally connected thereto at pivot connections located above the upper surface of said top plate at least in the uppermost positions of said slides.

17. A chuck for simultaneously gripping workpieces and pulling same against stops comprising:

support means for supporting chuck components and having a longitudinal axis, a substantially flat top plate supported by said support means and having a plurality of circumferentially-spaced openings therethrough, a plurality of stops supported on said top plate, gibs supported in said openings in said top plate, means for adjusting at least one such gib for each said opening in a direction generally parallel to said axis, a plurality of slides slidably guided by said gibs through said openings in said top plate for movement along linear paths inclined to said axis, said slides having upper ends extending generally parallel to the upper surface of said top plate, and workpiece gripping jaws mounted on said upper ends of said slides, whereby movement of said slides produces movement of said jaws with components extending both generally radially of and parallel to said axis for simultaneously gripping workpieces and pulling same against said stops.

* * * * *